United States Patent [19]

DiFazio

[11] Patent Number: 4,570,406
[45] Date of Patent: Feb. 18, 1986

[54] SCREEN FRAME CORNER CONNECTOR KEY

[75] Inventor: Joseph DiFazio, Troy, Mich.

[73] Assignee: Acorn Building Components, Inc., Detroit, Mich.

[21] Appl. No.: 560,566

[22] Filed: Dec. 12, 1983

[51] Int. Cl.³ .............................................. E04C 2/38
[52] U.S. Cl. ...................................... 52/656; 52/475; 403/402
[58] Field of Search ................. 52/475, 656, 657, 658, 52/818; 403/295, 401, 402, 403

[56] References Cited

U.S. PATENT DOCUMENTS

| 2,703,159 | 3/1955 | Van Fleet | 52/657 |
| 2,717,667 | 9/1955 | Bancroft | 403/295 |
| 2,989,788 | 6/1961 | Kessler | 403/295 |
| 3,321,885 | 5/1967 | Pratt | 160/381 |
| 3,374,597 | 3/1968 | Whitener | 52/656 |
| 3,510,985 | 5/1970 | Smits | 403/295 |
| 3,606,419 | 9/1971 | Virkler et al. | 52/818 |
| 3,784,043 | 1/1974 | Presnick | 52/823 |
| 4,099,815 | 7/1978 | Cox et al. | 403/295 |
| 4,136,496 | 1/1979 | Molyneux | 52/656 |
| 4,358,213 | 11/1982 | Hawkins et al. | 52/656 |
| 4,368,584 | 1/1983 | Logan | 403/401 |

FOREIGN PATENT DOCUMENTS 7610404  3/1978  Netherlands .................... 403/295

Primary Examiner—John E. Murtagh
Assistant Examiner—Andrew Joseph Rudy
Attorney, Agent, or Firm—Cullen, Sloman, Cantor, Grauer, Scott and Rutherford

[57] ABSTRACT

A hollow, thin wall, generally rectangular shaped corner connector key forms the frame corner and connects together the adjacent ends of tubular screen frame members. The legs of the L-shaped key form a hollow box-like corner portion, against which the frame ends are abutted. Integral leg extensions telescopically fit into and are frictionally locked against the interior wall surfaces of the frame members. The hollow, tubular cross-section shape of the key, whose box-like corner portion corresponds to the cross-sectional shape of the exterior of the frame members, and whose leg extensions correspond to the interior cross-section of the frame members, coupled with the frame member abutments and the frictional locking, substantially rigidifies the frame corner and resists out-of-plane twisting or bending of the frame.

1 Claim, 8 Drawing Figures

U.S. Patent  Feb. 18, 1986  4,570,406
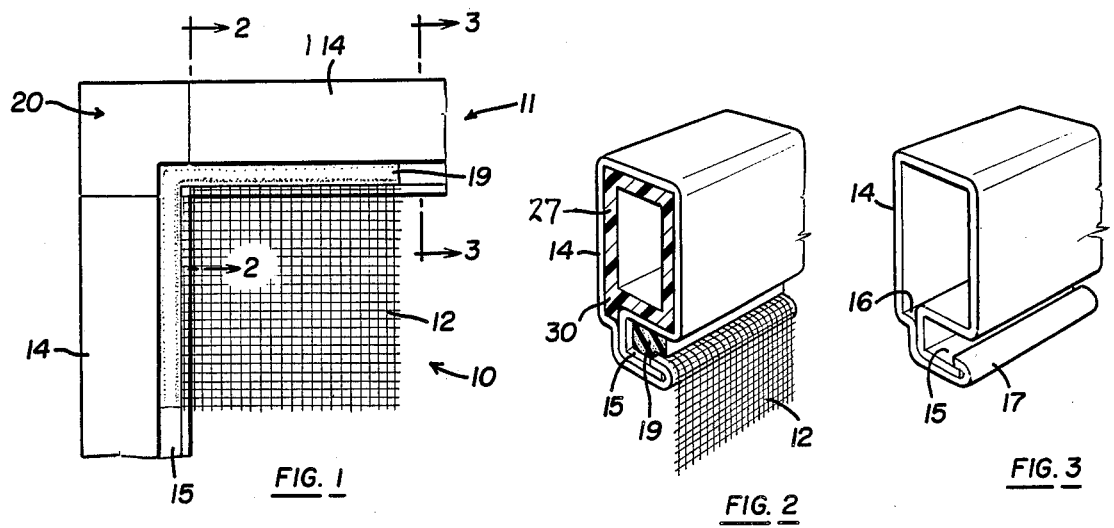
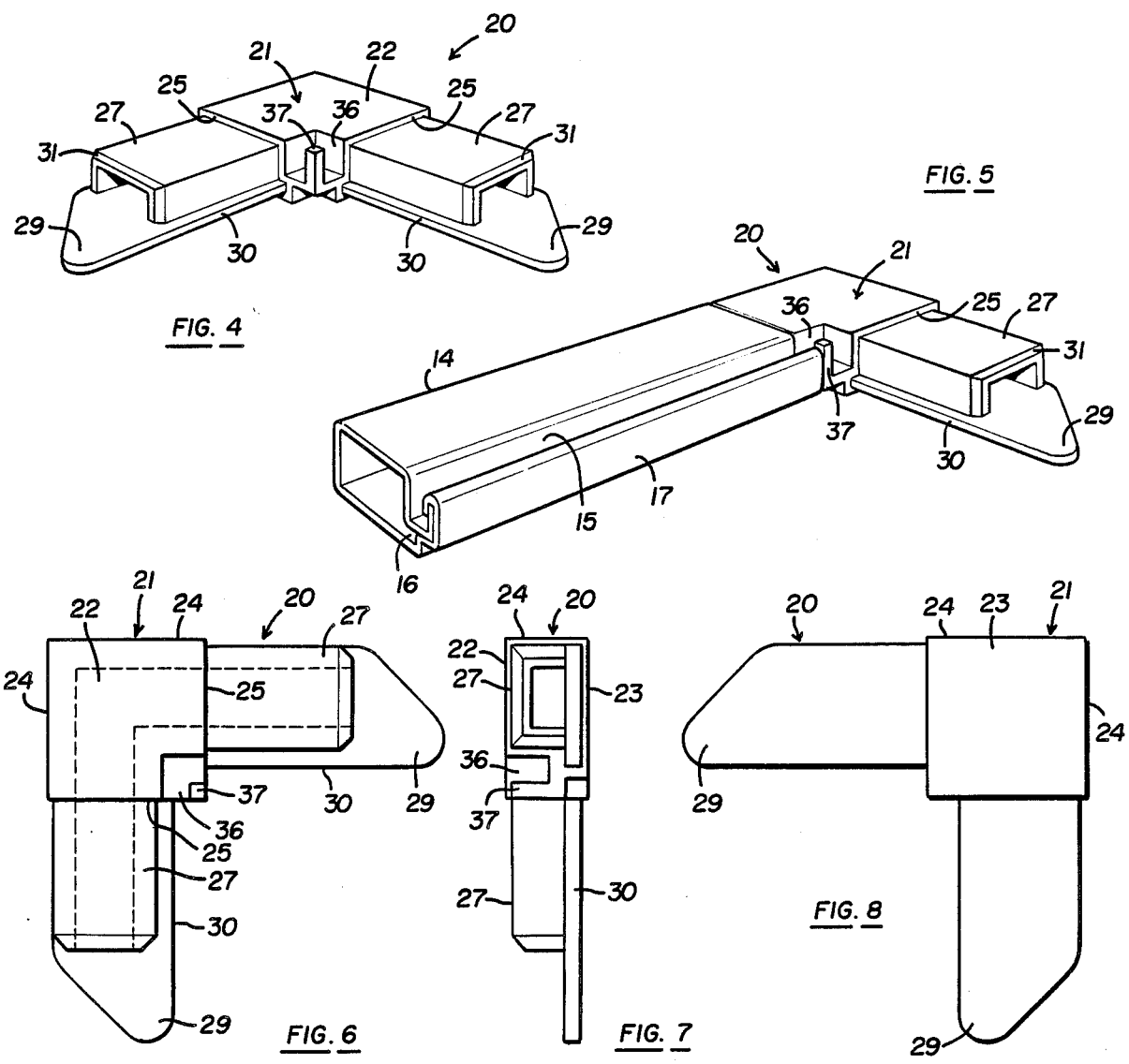

SCREEN FRAME CORNER CONNECTOR KEY

BACKGROUND OF INVENTION

Framed screened panels, such as are used for window screens, patio door screens and the like, are commonly made of four elongated frame members which are connected together at their opposite ends to form corners. The screen material, such as foraminous cloth-like screening, is conventionally secured to the frame members by holding its peripheral edges within open grooves that are formed along the inside edges of the frame members. An example of such a panel is disclosed in U.S. Pat. No. 3,321,885, issued May 30, 1967 to Pratt.

Commonly used frame members are formed in the shape of hollow, roughly rectangular shaped, tubes which are typically either extruded aluminum or roll formed sheet metal. These elongated frame members which make up the top, bottom and side parts of the frame, are ordinarily of uniform cross-section. Their opposite ends, normally, are mitered to form 45° angle joints. The joints are rigidified and the ends of the frame members are interconnected by frame connector keys which generally comprise a pair of legs that are joined together at right angles. The legs are inserted within the adjacent open ends of the frame members and staked or otherwise locked to the frame members to form the joint. Examples of such corner constructions are disclosed in the foregoing patent to Pratt, U.S. Pat. No. 3,332,885 and in Bancroft, U.S. Pat. No. 2,717,667, issued Sept. 13, 1955, Kessler, U.S. Pat. No. 2,989,788, issued June 27, 1961 and Virkler et al, U.S. Pat. No. 3,606,419, issued Sept. 20, 1961.

Also, Weitzel, U.S. Pat. No. 1,852,866, issued Apr. 5, 1932 discloses a corner key connector, which is somewhat complicated in construction, to interconnect frame members having square cut ends, rather than mitered ends.

In the case of large screen panels, particularly those used for patio door screens and screens for larger windows, prior corner connectors have been inadequate to rigidify the panel enough to prevent twisting or bending of the panel. The twisting or bending of the panel out of its plane is particularly troublesome when the panel is removed from its support framing, such as for cleaning the window panel covered by it, and then attempts are made to replace it. However, the twisting or bending also presents problems during normal operation in that the screen may bind within its support tracks or outer support.

Thus, there has been a need for a rigid corner construction of a simple, inexpensive form which can be easily assembled or easily removed for replacement when desired. The invention herein is concerned with an improved corner connector key which forms an unusualy rigid corner construction for minimizing twisting or bending of the panel.

SUMMARY OF INVENTION

The invention herein contemplates a simple, inexpensive corner connection key which may be molded out of plastic, and which frictionally interconnects with the end portions of conventional frame members that can be square cut rather than mitered. The corner connector itself forms the exposed corner of the frame. Thus, it is sized and shaped to match or blend with the ends of the frame members to form a visually uniform frame which does not require mechanical fasteners or stakes.

The connector key is formed of two legs arranged at right angles and integrally joined together at a central portion. Such portion is formed in a box-like shape which is flat, closed ended and corresponds in size and shape to the frame members. The frame members are abutted against shoulders formed on the inner ends of the box-like central portion. The legs telescopically fit within and are frictionally locked against the interior wall surfaces of the frame members. These legs are made of rectangular tubular shape corresponding to the interior cross section of the frame members so that the walls of the extensions are in substantially full face to face contact with the interior walls of the frame members.

Further, the invention contemplates forming one of the walls which makes up the tubular shaped legs wider and longer than the main tubular body so as to provide an edge flange and a tongue-like portion for engaging within the usual interior channel formed within many common frame members for further rigidification.

An object of this invention is to provide a corner key molding which can be manually pushed into the open ends of frame members without special preparation of the frame members other than square cutting their ends and which will immediately frictionally interlock to the frame members to produce an unusually rigid and twist resistant corner joint. The corner connector also forms the actual corner of the frame. Hence, the material can be molded of a color or otherwise coated with a color which matches the coloring of the frame members, for better visual appearance.

Another object of the invention is to form a corner connector key which is tubular shaped to provide a rigid tubular central, corner forming, portion and rigid tubular leg extensions that fit within and provide an inner tubular layer within the end portions of the conventional frame members. Meanwhile, the frame member ends are abutted tightly against shoulders formed on the connectors to produce a superior corner joint with minimal time, labor and expense.

These and other objects and advantages will become apparent upon reading the following description, of which the attached drawings form a part.

DESCRIPTION OF DRAWINGS

FIG. 1 is a fragmentary, elevational view, of the upper corner of a framed screen, such as of a patio door screen or large window screen.

FIG. 2 is a cross-sectional, fragmentary, perspective view taken in the direction of arrows 2—2 of FIG. 1 and shows a portion of the frame with the corner connector legs positioned inside of it.

FIG. 3 is a fragmentary, cross-sectional perspective view of the frame member taken in the direction of arrows 3—3 of FIG. 1.

FIG. 4 is an enlarged, perspective view, of a corner connector.

FIG. 5 is a perspective view of the corner connector of FIG. 4, but showing the end portion of a frame member fitted upon the connector.

FIG. 6 is an elevational, front view of the frame connector key.

FIG. 7 is a side view of the connector of FIG. 6.

FIG. 8 is a rear view of the connector shown in elevation.

DETAILED DESCRIPTION

FIG. 1 illustrates an upper corner of a framed screen 10 which may be a large size patio door screen panel. A frame 11 surrounds the foraminous cloth material 12 to make up the screen panel.

The frame is formed of four elongated framed members 14 which are generally rectangular shaped, tubular, thin wall, roll formed sheet metal parts. These frame members are of conventional construction. They include the usual selvage and stuffer groove 15 formed along their inner edges to provide a place for fastening the selvage of the foraminous material to the frame. The frame members also include an internal channel 16 which is formed by the bending of the metal to provide the bent flange 17 which makes up the groove 15.

As is conventional, the edge or selvage material, which can be aluminum woven cloth or the like, is applied over the open groove 15 which is continuous and extends around the entire interior of the frame. Then, a stuffer strip or spline 19 is pressed over the material and into the groove 15 to hold the material in place fastened to the frame.

The invention relates to the frame corner connector key 20 which preferably is formed of a molded plastic material, such as rigid polyurethane or the like. Numerous suitable rigid plastic materials are commercially available and are known to those skilled in the field.

The connector is a generally L-shaped piece having integral legs that extend at right angles to each other. The legs are hollow, thin wall, generally rectangular in shape. The connected portion of the legs make up a central, corner forming box-like portion 21 which has an integral top plate or wall 22 and bottom wall 23 with outer side walls 24 (referring to the orientation of FIG. 6). Open, inner side walls 25 have leg extensions 27 integral therewith. These extensions are flat, generally rectangular shaped thin wall tubes having a lower (referring to FIG. 4) widened wall to provide a curved-end tongue-like leader 29 and a side flange 30. The free ends of the leg extensions are beveled at 31. As can be seen, the entire interior of the connector key is hollow, forming a hollow or open interior.

The open, inner side walls 25 form a substantially continuous abutment shoulder 34 around the leg extensions 27. To provide the shoulder, the wall thickness of the center corner forming box-like part 21 is thicker than the wall thickness of the leg extensions 27. That is, the inner opening in the legs can be substantially uniform in cross-section. By varying the wall thicknesses, i.e., making the wall of the central part thicker than the wall of the leg extension part, the shoulder is formed.

To assemble a frame, the frame members 11, whose ends have been cut square relative to the longitudinal axis of the member, telescopically receive the adjacent leg extensions 27. The end of each frame member abuts against, in face to face contact, the continuous abutment shoulder. Meanwhile, the leg extensions are formed of a size and shape to snugly fit within the interior of the frame member in substantially full face to face contact with the interior surfaces of the leg member. The lead, tongue-like end portion of each leg assists in positioning the leg within the frame member. The side flange 30 is also snugly fitted within the internal channel 16 of the frame member. The result is that the leg members form frictional contact, assuming the parts are properly dimensioned, with the interior surface of the frame members. Thus, the connection can be utilized without staking or mechanical fasteners such as screws or the like. Removal, such as for repair or for knock-down movement of a large patio door screen, can be achieved by simply pulling the leg extensions out of the frame members with sufficient force for that purpose.

The center portions of the connector are dimensioned to blend with and form, from an appearance viewpoint, an integral portion of the complete frame. Thus, in order to accommodate the edge of the screen material and the stuffer strip, a notch 36 is formed in the inner corner of the plate or wall 22, leaving a post 37 which abuts the adjacent ends of the flanges 17 of the frame members. This further reinforces and rigidifies the overall frame structure.

Having fully described an operative embodiment of this invention, I now claim:

1. In a screen frame corner construction formed of a pair of elongated, thin wall, open-ended tubular frame members arranged at right angles to each other, with a corner connector key arranged between and having perpendicularly arranged integral legs that are telescopically fitted within adjacent member end portions, the improvement comprising:

the transverse cross-sectional shape of each frame member being substantially uniform along a full length of said member and including a generally rectangular tubular portion defined by exterior and interior dimensions, a generally U-shaped groove for receiving the peripheral edge of screening material to be assembled to the screen frame, and a pocket opening into and forming an extension along one side of the interior of said rectangular porton;

said corner connector key comprising a corner portion at the intersection of said integral legs, the exterior transverse cross-sectional shape of said corner portion being shaped and dimensioned to be the same as that of the exterior of said rectangular tubular portion of said frame members;

the exterior cross-sectional shape of said integral legs being shaped and dimensioned to be substantially the same as said interior dimensions of said frame member rectangular tubular portion so as to be snugly but slidably insertable therein in telescoping fashion.

said corner connector key having circumferential shoulders located where larger exterior dimensions of said corner portion meet smaller exterior dimensions of said integral legs, said shoulders defining a positive stop for the ends of said frame members which limits the insertion length of said integral legs into said frame members;

each of said integral legs further having a flange extending continuously along one longitudinal side thereof, said flange being dimensioned and positioned to be snugly telescopically received within said pocket of said frame member when said leg is inserted therein, and said flange also extending longitudinally beyond the end of said leg remote from said corner portion to form a guide to assist in aligning said leg with said frame member during insertion;

and said corner connector key further having a post aligned with said shoulders but spaced therefrom to define therebetween a pair of perpendicularly intersecting grooves which are aligned with said U-shaped grooves of said frame members, whereby a continuous groove is formed around the full periphery of an assembled screen frame, said post also functioning as an abutment for both fully inserted frame member;

whereby the snug fit of said corner connector key legs within said frame members, coupled with the abutment of the ends of said frame members against said shoulders and said post rigidifies the assembled screen frame.

* * * * *